US009548848B1

(12) United States Patent
Patel et al.

(10) Patent No.: US 9,548,848 B1
(45) Date of Patent: Jan. 17, 2017

(54) METHOD AND APPARATUS FOR REDUCED COMPLEXITY CQI FEEDBACK IN WIRELESS COMMUNICATION SYSTEMS

(71) Applicant: MBIT WIRELESS, INC., Newport Beach, CA (US)

(72) Inventors: Bhaskar Patel, San Clemente, CA (US); Arumugam Govindswamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 101 days.

(21) Appl. No.: 14/625,977

(22) Filed: Feb. 19, 2015

(51) Int. Cl.
| H04L 5/00 | (2006.01) |
| H04L 1/00 | (2006.01) |
| H04L 1/20 | (2006.01) |
| H04W 72/04 | (2009.01) |

(52) U.S. Cl.
CPC .......... *H04L 5/0057* (2013.01); *H04L 1/0003* (2013.01); *H04L 1/0009* (2013.01); *H04L 1/20* (2013.01); *H04W 72/042* (2013.01)

(58) Field of Classification Search
CPC .................................................. H04L 15/0057
USPC ......................................................... 370/329
See application file for complete search history.

(56) References Cited

U.S. PATENT DOCUMENTS

| 8,442,448 | B2 * | 5/2013 | Kim ..................... H04B 7/0452 |
| | | | 455/69 |
| 8,903,327 | B2 * | 12/2014 | Garavaglia ........... H04L 1/0026 |
| | | | 370/252 |
| 2007/0230428 | A1 * | 10/2007 | Seki ...................... H04W 72/10 |
| | | | 370/341 |
| 2009/0154588 | A1 * | 6/2009 | Chen ..................... H04L 1/0026 |
| | | | 375/267 |
| 2009/0163142 | A1 * | 6/2009 | Pi .......................... H04L 1/0026 |
| | | | 455/62 |
| 2010/0322102 | A1 * | 12/2010 | Zhou ..................... H04L 1/0021 |
| | | | 370/252 |
| 2011/0136525 | A1 * | 6/2011 | Fujii .................. H04B 7/15592 |
| | | | 455/507 |

(Continued)

FOREIGN PATENT DOCUMENTS

SE  WO 2010144002 A1 * 12/2010 ............. H04L 12/12

*Primary Examiner* — Melvin Marcelo
*Assistant Examiner* — Peter G Solinsky
(74) *Attorney, Agent, or Firm* — Lerner, David, Littenberg, Krumholz & Mentlik, LLP (57) ABSTRACT

Adaptive Modulation and Coding Scheme (MCS) selection is used in many wireless communication systems. The goal of Adaptive MCS selection is to use the most suitable MCS for any particular channel conditions. Often, the MCS selection is based on channel measurements by the client terminal. The relationship between the block error rate (BLER) and the Signal-to-Interference-plus-Noise Ratio (SINR) is not linear. The BLER is often determined by the lowest SINR rather than the average SINR experienced by the set of bits that are part of the block. The Exponential Effective SINR Mapping (EESM) method is often used to compute effective SINR for adaptive MCS selection. However, the complexity of selecting the optimum channel feedback from the client terminal to the base station is typically high. A method and apparatus are disclosed that enable EESM for selecting the most suitable MCS with reduced complexity and reduced power consumption.

17 Claims, 8 Drawing Sheets

(56) References Cited

U.S. PATENT DOCUMENTS

| | | | | |
|---|---|---|---|---|
| 2012/0140655 | A1* | 6/2012 | Han | H04L 1/20 370/252 |
| 2013/0021931 | A1* | 1/2013 | Kim | H04L 1/0003 370/252 |
| 2013/0022142 | A1* | 1/2013 | Nammi | H04B 7/0689 375/267 |
| 2013/0072123 | A1* | 3/2013 | Garavaglia | H04L 1/0026 455/63.1 |
| 2013/0332762 | A1* | 12/2013 | Meirosu | H04L 12/12 713/323 |
| 2014/0016533 | A1* | 1/2014 | Nagata | H04W 72/046 370/312 |
| 2014/0204857 | A1* | 7/2014 | Mallik | H04L 1/0009 370/329 |
| 2014/0269603 | A1* | 9/2014 | Aminaka | H04W 72/1205 370/329 |
| 2014/0334417 | A1* | 11/2014 | Aminaka | H04W 72/12 370/329 |
| 2015/0029965 | A1* | 1/2015 | Aminaka | H04W 88/085 370/329 |
| 2015/0079981 | A1* | 3/2015 | Zhu | H04W 48/16 455/434 |
| 2015/0215063 | A1* | 7/2015 | Kuchi | H04J 11/005 370/329 |
| 2015/0282184 | A1* | 10/2015 | Yang | H04W 52/265 455/513 |
| 2015/0282202 | A1* | 10/2015 | Miao | H04L 1/00 370/329 |
| 2016/0044526 | A1* | 2/2016 | Pawar | H04W 28/0226 370/230 |
| 2016/0119926 | A1* | 4/2016 | Sahara | H04L 1/0003 370/329 |
| 2016/0191201 | A1* | 6/2016 | Park | H04L 1/0026 370/252 |

\* cited by examiner

FIG. 1

(Prior Art)

| CQI index | Modulation | Approximate code rate | Efficiency (payload bits/symbol) |
|---|---|---|---|
| 0 | Out of range | | |
| 1 | QPSK | 0.076 | 0.1523 |
| 2 | QPSK | 0.12 | 0.2344 |
| 3 | QPSK | 0.19 | 0.3770 |
| 4 | QPSK | 0.3 | 0.6016 |
| 5 | QPSK | 0.44 | 0.8770 |
| 6 | QPSK | 0.59 | 1.1758 |
| 7 | 16-QAM | 0.37 | 1.4766 |
| 8 | 16-QAM | 0.48 | 1.9141 |
| 9 | 16-QAM | 0.6 | 2.4063 |
| 10 | 64-QAM | 0.45 | 2.7305 |
| 11 | 64-QAM | 0.55 | 3.3223 |
| 12 | 64-QAM | 0.65 | 3.9023 |
| 13 | 64-QAM | 0.75 | 4.5234 |
| 14 | 64-QAM | 0.85 | 5.1152 |
| 15 | 64-QAM | 0.93 | 5.5547 |

METHOD AND APPARATUS FOR REDUCED COMPLEXITY CQI FEEDBACK IN WIRELESS COMMUNICATION SYSTEMS

BACKGROUND OF THE INVENTION

Figure 1:
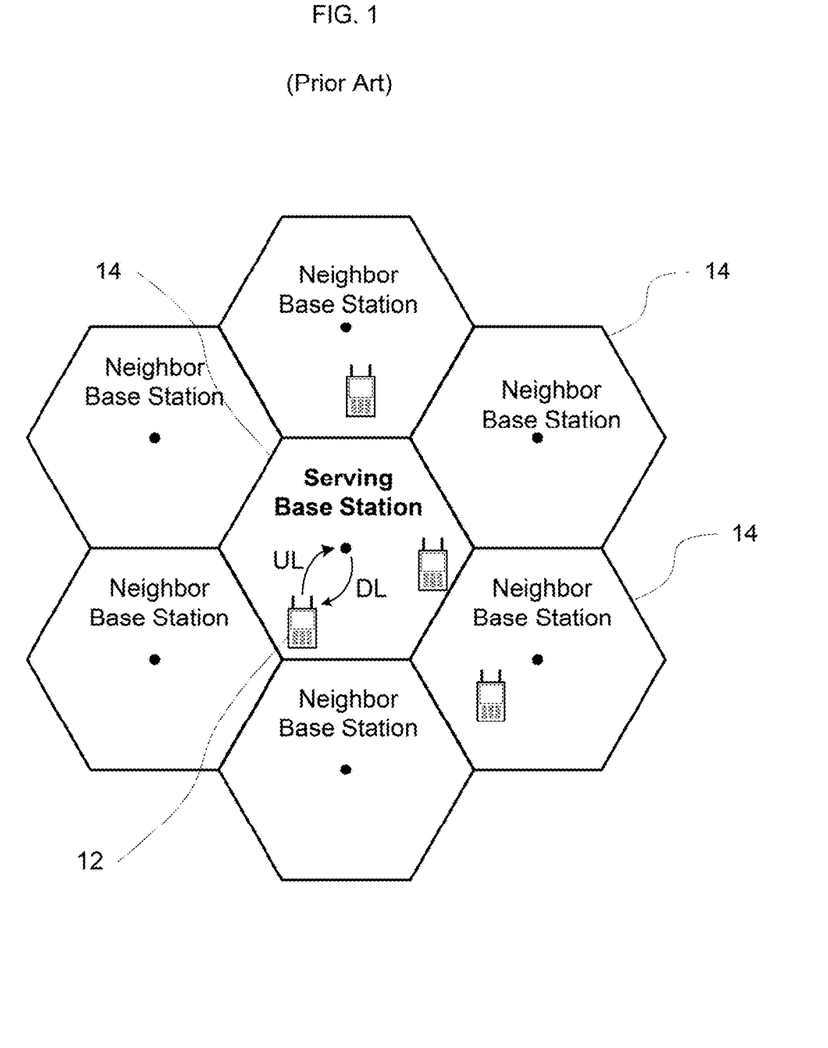
FIG. 1 illustrates a conventional mobile wireless communication system.

As shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station to which the client terminal is communicating with is referred as the serving base station. In some wireless communication systems the serving base station is normally referred as the serving cell. The terms base station and a cell may be used interchangeably herein. In general, the cells that are in the vicinity of the serving cell are called neighbor cells. Similarly, in some wireless communication systems a neighbor base station is normally referred as a neighbor cell. A neighbor cell that is a candidate for handover or reselection is referred as a target cell herein. Whenever a cell becomes a serving cell for a client terminal, that cell is referred as visited cell herein.

In order to improve system capacity, peak data rate and coverage reliability, the signal transmitted to a particular user can be adapted by the base station to compensate for the signal quality variations. This process is known as link adaptation. In cellular wireless communication systems, the quality of the signal received by a client terminal depends on the channel quality from the serving cell, the level of interference from neighbor cells, and the noise level. One of the well known techniques for link adaptation is the Adaptive Modulation and Coding (AMC). With AMC, the modulation and coding formats are changed to match the prevailing radio channel capacity for each client terminal. In a system with AMC, client terminals close to the base station may be typically assigned higher-order modulation and high code rate, for example 64-Quadrature Amplitude Modulation (QAM) with high code rate, but the modulation-order and the code rate may decrease as the distance from the base station increases.

In the 3rd Generation Partnership Project (3GPP) Long Term Evolution (LTE) wireless communication system, the base station typically selects the modulation scheme and code rate depending on a prediction of the downlink channel conditions. An important input to this selection process is the Channel Quality Indicator (CQI) feedback transmitted by the client terminal in the uplink. The CQI feedback is an indication of the data rate which can be supported by the channel, taking into account the Signal-to-Interference-plus-Noise Ratio (SINR) and the capabilities of the client terminal's receiver.

The CQI feedback is derived from the downlink received signal quality, which may be based on the measurements of the downlink reference signals which are transmitted by the base station. The client terminal indicates the highest Modulation and Coding Scheme (MCS) that it can decode with a Block Error Rate (BLER) probability not exceeding a specified level, e.g., 10%. Thus the information received by the base station takes into account the capabilities of the client terminal's receiver, and not just the prevailing radio channel quality. The highest selected MCS is mapped to one of the possible CQI values based on mapping specified by the wireless communication system specification. Hence a client terminal that is designed with advanced signal processing algorithms can report a higher CQI and may achieve a higher data rate.

Figure 2:
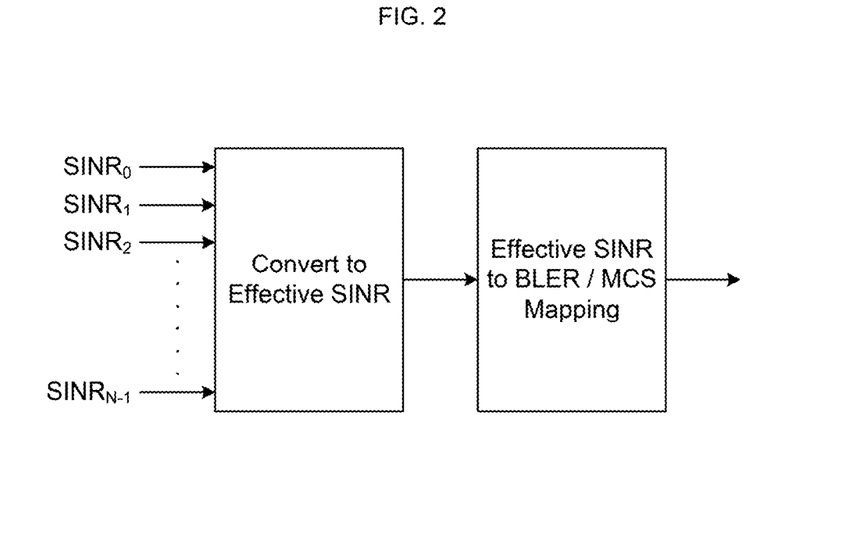
FIG. 2 illustrates the Effective Exponential SINR Mapping Methodology.

A key issue in system level performance is the need to predict a BLER from the instantaneous SINR for each subcarrier of an OFDM symbol. For example, the same SINR under static and various fading conditions may yield different BLER depending on the specific conditions. Therefore, a link quality model such as Effective Exponential SINR Mapping (EESM) may be used for mapping a set of instantaneous SINRs to a single effective SINR for predicting the BLER under any given channel conditions. The objective of EESM is to find a compression function that maps the set of SINRs to a single value that is a good predictor of the actual BLER for a given MCS. FIG. 2 illustrates the EESM methodology. Note that EESM is one of the commonly used methods for the link quality model and other models are possible. For illustrating the present invention the EESM link model is used.

The mapping of the effective SINR value to the corresponding BLER value may use either a look-up table for the mapping function or use an approximate analytical expression. The EESM method estimates the effective SINR using the following formula:

$$\gamma_{\mathit{eff}} = EESM(\gamma_k, \beta) = -\beta \ln\left(\frac{1}{N}\sum_{k=0}^{N-1} e^{-\frac{\gamma_k}{\beta}}\right) \quad \text{EQ. (1)}$$

Where, $\gamma$ is a vector $[\gamma_0, \gamma_1, \ldots, \gamma_{N-1}]$ of the per-subcarrier SINR values, which may be typically different in a frequency selective channel. The parameter $\beta$ may be determined for each CQI and this value is used to adjust EESM function to compensate the difference between the actual BLER and the predicted BLER.

Figure 3:
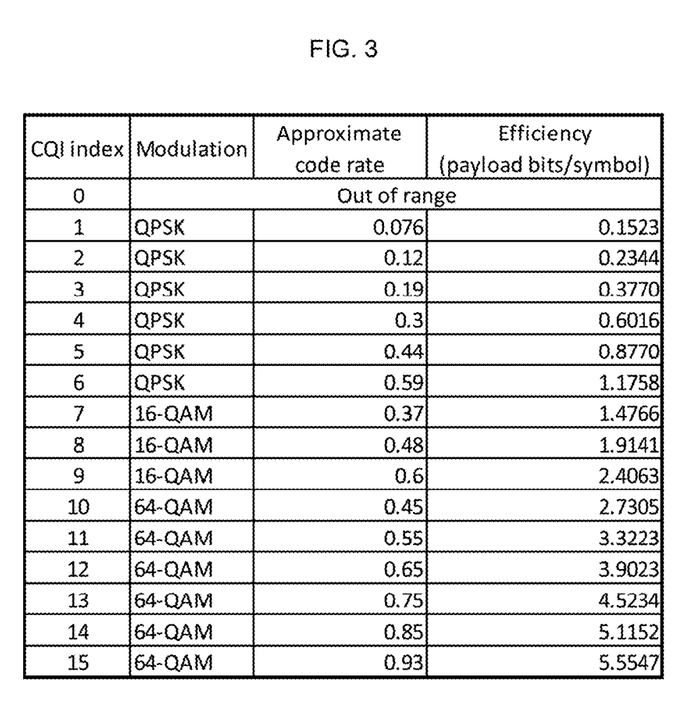
FIG. 3 illustrates a list of code rate, modulation type and the bandwidth efficiency of each CQI used in a conventional 3GPP LTE wireless communication system.

The $\beta$ values are specific to each CQI and are optimized based on offline simulations performed across different fading profiles and SINRs, and are used to establish the mapping between instantaneous SINR and effective SINR. For example, in 3GPP LTE wireless communication system, there are 16 possible CQIs to be considered for channel quality feedback reports as shown in the table contained in FIG. 3. Using the Additive White Gaussian Noise (AWGN) performance charts as a reference, the BLER value of each CQI for different fading propagation conditions is mapped to an AWGN equivalent SINR. The AWGN SINR for each CQI is denoted as $SINR_{AWGN}$.

During normal operation, the $\gamma_{\mathit{eff}}$ needs to be computed from the set of per subcarrier SINRs for each possible value of CQI and the corresponding $\beta$ value. In the case of a 3GPP LTE wireless communication system, there may be up to 1200 subcarriers when using a 20 MHz channel bandwidth. Therefore, EQ. (1) may need to be evaluated for up to 1200 subcarriers (N=1200) and the computations have to be repeated for 16 different CQIs and the corresponding $\beta$. This is a non-trivial task that can be resource intensive.

The final output of the EESM process is the highest CQI with an effective SINR greater than $SINR_{AWGN}$ as an optimum CQI for given channel conditions. Conventionally, two methods are used to reduce complexity of $\gamma_{eff}$ computations. One method is to estimate the effective SINR starting from the highest CQI and decrement the CQI index such that at most within 15 iterations the optimum CQI can be selected in case of 3GPP LTE wireless communication system. The computed effective SINR $\gamma_{eff}$ is compared against the $SINR_{AWGN}$ for the current CQI candidate. If the computed $\gamma_{eff}$ is lower than the $SINR_{AWGN}$ for the current CQI, then the $\gamma_{eff}$ computation is performed for the next lower CQI and its corresponding $\beta$. This process is repeated until the point where the $\gamma_{eff}$ is equal to or greater than the required $SINR_{AWGN}$ for the current CQI. Another method for finding the optimum CQI with reduced complexity is to perform a binary search or other search mechanisms such that, in case of 15 different CQIs, within five steps the best CQI may be selected as shown with example in FIG. 4. Such techniques may be computer processor intensive and time consuming. This can be detrimental to the operation of the wireless device and the overall communication system.

SUMMARY OF THE INVENTION

A method and apparatus are disclosed that enable the optimum selection of CQI with reduced computations for $\gamma_{eff}$. Reducing the computations leads to faster and more efficient operation. This, in turn, leads to reduced power consumption while determining the optimum CQI for prevailing channel conditions. Therefore, such techniques are advantageous not only to the wireless device itself, but also to overall communication with the wireless network.

In accordance with one aspect of the invention, a method comprises obtaining, by a processor, one or more inputs including a set of instantaneous Signal-to-Interference-plus-Noise Ratio (SINR) values $\gamma_k$; determining, by the processor, a mean instantaneous SINR ($SINR_{MI}$) according to the instantaneous SINR values $\gamma_k$, the $SINR_{MI}$ being a linear average of the instantaneous SINR values $\gamma_k$; determining, by the processor, a first adaptive selection criterion that identifies an upper limit on a supportable Channel Quality Indicator (CQI) for prevailing signal conditions in relation to the $SINR_{MI}$; determining, by the processor, a second adaptive selection criterion that identifies a lower limit on the supportable CQI for the prevailing signal conditions in relation to the $SINR_{MI}$; deriving, by the processor from the supportable CQI between the identified upper and lower limits of the first and second selection criteria, a selected CQI parameter; and using the selected CQI parameter to implement a modulation and coding scheme for communication between the client device and a base station in the wireless communication system.

In one example, determining the first adaptive selection criterion includes comparing the $SINR_{MI}$ against an Additive White Gaussian Noise SINR ($SINR_{AWGN}$) for a currently considered CQI. In another example, determining the second adaptive selection criterion includes comparing the $SINR_{MI}$ against a metric derived from parameters associated with the currently considered CQI. Here, determining the second adaptive selection criterion may be performed according to the following comparison: $SINR_{MI} \leq \beta(CQI_{CURRENT})^*\alpha(CQI_{CURRENT})$, wherein the metric includes parameters $\beta$ and $\alpha$, where $\beta$ is a value specific to the currently considered CQI and $\alpha$ is a saturation value. In this case, when the $SINR_{MI}$ is greater than $\beta(CQI_{CURRENT})^*\alpha((CQI_{CURRENT})$, the method may further comprises setting the selected CQI to be equal to the currently considered CQI. Also, a may be a number that is a function of a bit width of a specific implementation used by the client device.

In a further example, the method further comprises estimating, by the processor, an effective SINR and comparing the effective SINR against the $SINR_{AWGN}$ for a currently considered CQI. Here, estimating the effective SINR may include calculating an Effective Exponential SINR Mapping (EESM). In this case, the EESM may be calculated for a particular CQI only when the $SINR_{MI}$ is greater than the $SINR_{AWGN}$ of the particular CQI. Or the EESM may be calculated for a particular CQI only when the $SINR_{MI}$ is greater than $\beta(CQI_{CURRENT})^*\alpha(CQI_{CURRENT})$.

In yet another example, determining the first and second adaptive selection criteria are repeatedly applied until a condition where $SINR_{MI} > \beta(CQI_{CURRENT})^*\alpha(CQI_{CURRENT})$ is met, where $\beta$ is a value specific to a currently considered CQI and $\alpha$ is a saturation value. In this scenario, a may be determined by an offline simulation.

In another example, determining the first and second adaptive selection criteria are performed without calculating an Effective Exponential SINR Mapping (EESM). Alternatively, the set of input instantaneous SINR values $\gamma_k$ are for each subcarrier from a set of most recently received valid downlink signals. 15. The one or more inputs may further include one or more of a set of $\beta$ values, a set of a values, and a set of $SINR_{AWGN}$ values for each CQI.

According to another aspect of the invention, a receiver device for a wireless communication apparatus is provided. The receiver device comprises means for receiving signals from one or more base stations in a wireless communication system and one or more processing devices operatively coupled to the receiving means. The one or more processing devices are configured to obtain one or more inputs including a set of instantaneous Signal-to-Interference-plus-Noise Ratio (SINR) values $\gamma_k$. The one or more processing devices are also configured to determine a mean instantaneous SINR ($SINR_{MI}$) according to the instantaneous SINR values $\gamma_k$, where the $SINR_{MI}$ is a linear average of the instantaneous SINR values $\gamma_k$. The one or more processing devices are further configured to determine a first adaptive selection criterion that identifies an upper limit on a supportable Channel Quality Indicator (CQI) for prevailing signal conditions in relation to the $SINR_{MI}$; determine a second adaptive selection criterion that identifies a lower limit on the supportable CQI for the prevailing signal conditions in relation to the $SINR_{MI}$; derive, from the supportable CQI between the identified upper and lower limits of the first and second selection criteria, a selected CQI parameter; and use the selected CQI parameter to implement a modulation and coding scheme for communication between the wireless communication apparatus and the one or more base stations in the wireless communication system.

In one example, the first adaptive selection criterion is determined by comparing the $SINR_{MI}$ against an Additive White Gaussian Noise SINR ($SINR_{AWGN}$) for a currently considered CQI. And in another example, the second adaptive selection criterion is determined by comparing the $SINR_{MI}$ against a metric derived from parameters associated with the currently considered CQI.

According to a further aspect of the invention, a non-transitory recording medium stores instructions thereon. The instructions, when executed by one or more processors, cause the one or more processors to execute a method. The method comprises obtaining one or more inputs including a set of instantaneous Signal-to-Interference-plus-Noise Ratio (SINR) values $\gamma_k$; determining a mean instantaneous SINR ($SINR_{MI}$) according to the instantaneous SINR values $\gamma_k$, the $SINR_{MI}$ being a linear average of the instantaneous SINR values $\gamma_k$; determining a first adaptive selection criterion that identifies an upper limit on a supportable Channel Quality Indicator (CQI) for prevailing signal conditions in relation to the $SINR_{MI}$; determining a second adaptive selection criterion that identifies a lower limit on the supportable CQI for the prevailing signal conditions in relation to the $SINR_{MI}$; deriving, from the supportable CQI between the identified upper and lower limits of the first and second selection criteria, a selected CQI parameter; and using the selected CQI parameter to implement a modulation and coding scheme for communication between the client device and a base station in the wireless communication system. In one example, determining the first adaptive selection criterion includes comparing the $SINR_{MI}$ against an Additive White Gaussian Noise SINR ($SINR_{AWGN}$) for a currently considered CQI, and determining the second adaptive selection criterion includes comparing the $SINR_{MI}$ against a metric derived from parameters associated with the currently considered CQI.

DETAILED DESCRIPTION

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used. Also, unless otherwise stated herein, certain operations may be performed in a different order or in parallel.

According to an aspect of the present invention, an adaptive selection criteria may be used to perform EESM computations over only a subset of CQIs which are likely to be the highest CQIs that can be supported for a given channel conditions. The mean of instantaneous SINRs, referred to herein as Mean Instantaneous SINR ($SINR_{MI}$), is defined as the linear average of the instantaneous SINRs as shown in EQ. (2), is used for adaptive selection criteria.

$$SINR_{MI} = \frac{1}{N}\sum_{k=0}^{N-1} \gamma_k \qquad \text{EQ. (2)}$$

Note that for any value of $\beta>0$ substituted in EQ. (1), the estimated effective SINR $\gamma_{eff}$ will always be less than or equal to $SINR_{MI}$. Hence, if the $SINR_{MI}$ is less than $SINR_{AWGN}$ for a given CQI, then the effective SINR $\gamma_{eff}$ computed using EQ. (1) will also be less than $SINR_{AWGN}$. This relation is used to perform the EESM computation only on the CQIs that are going to meet the criteria $\gamma_{eff} \geq SINR_{AWGN}$. This method reduces the power consumption by performing the computations for effective SINR $\gamma_{eff}$ only over a subset of CQI candidates. According to one aspect of the present invention, a first adaptive selection criteria for EESM may be used as follows:

Effective SINR $\gamma_{eff}$ computation is performed for a particular CQI only when the $SINR_{MI}$ is greater than or equal to the $SINR_{AWGN}$ of that specific CQI, i.e., when $SINR_{MI} \geq SINR_{AWGN}$.

Note that the $SINR_{MI}$ is only computed once for each time the entire CQI feedback process is performed and the $SINR_{AWGN}$ for each CQI are pre-computed offline through simulations.

The value of $\beta$, obtained by offline simulations for each CQI, decreases as the CQI value decreases. If a lower $\beta$ value corresponding to a lower CQI is used in EQ. (1) when the prevailing channel conditions have high SINR, then the ratio $$\frac{\gamma_k}{\beta}$$

tends towards a very high value. As a result the kernel term $$e^{-\frac{\gamma_k}{\beta}}$$

in EQ. (1) approaches zero, thereby the effective SINR computed using the equation approaches zero. This, in turn, makes that particular CQI unsuitable for the prevailing signal conditions.

According to another aspect of the present invention, a metric called saturation SINR $\alpha$ is defined. According to this aspect of the present invention, the saturation SINR $\alpha$ is determined by performing offline simulations such that $\alpha = SINR_{MI}/\beta$ does not make the kernel term $$e^{-\frac{\gamma_k}{\beta}}$$

in EQ. (1) approach to zero. The actual value of a determined may be a function of the bit width of the specific implementation.

According to another aspect of the present invention, a second adaptive selection criteria for EESM may be used to avoid performing EESM computations for a lower CQI when a higher CQI is supportable for the given channel conditions as follows:

If the mean instantaneous $SINR_{MI} \geq \beta^*\alpha$, then the EESM computation for the current CQI is skipped and the next higher CQI is considered. The process is repeated until the precondition mean instantaneous $SINR_{MI} \geq \beta^*\alpha$ is met. The saturation value for each CQI is determined during offline simulations.

The first adaptive selection criterion puts an upper limit on the supportable CQI for prevailing signal conditions. The second adaptive selection criterion puts a lower limit on the supportable CQI for prevailing signal conditions. The upper and lower limits on the supportable CQI are determined without performing the computationally intensive EESM computations as per EQ. (1). Finally, the EESM computations as per EQ. (1) are performed for the reduced set of remaining CQIs.

Figure 4:
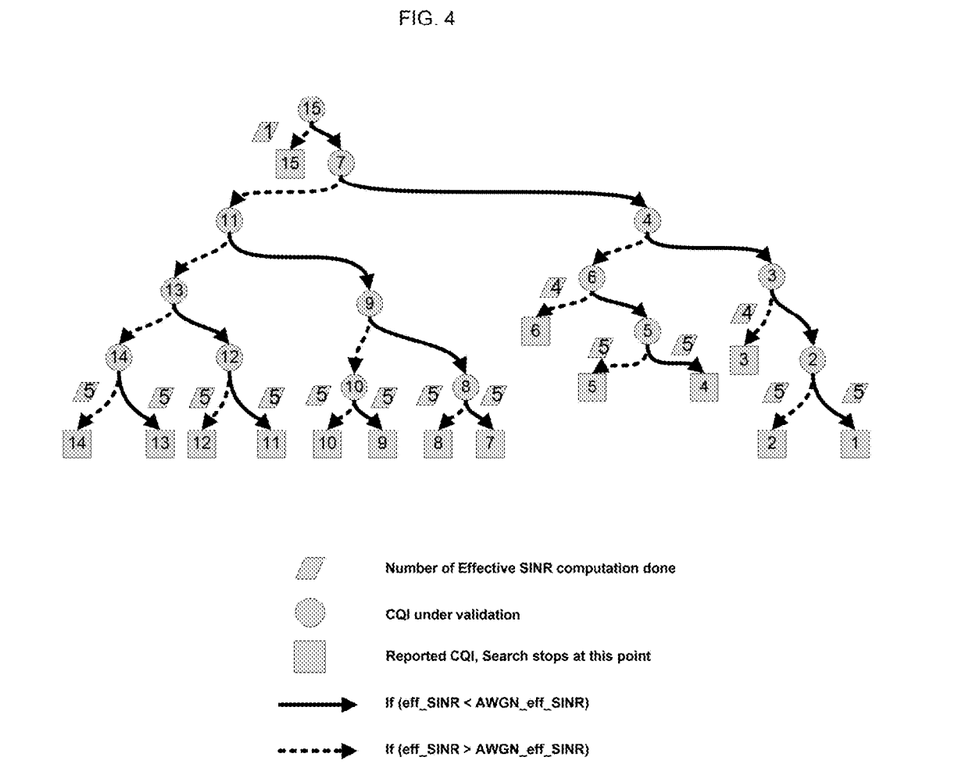
FIG. 4 illustrates CQI selection using a binary search method.

According to another aspect of the present invention, the search for the highest CQI within the reduced subset may be performed using a binary search within the subset in a manner similar to the method illustrated in FIG. 4. Summarizing the conditions that need to be checked for CQI feedback preparation:

1. Adaptive selection criteria 1: $SINR_{MI} \geq SINR_{AWGN}$.
2. Adaptive selection criteria 2: $SINR_{MI} \leq \beta^*\alpha$
3. Binary search within the subset created by adaptive selection criteria 1 and 2: compute effective SINR using EQ. (1) such that $\gamma_{eff} \geq SINR_{AWGN}$ The overall CQI selection procedure according to aspects of the present invention is illustrated in the exemplary flow diagram 500 contained FIG. 5. The processing in the flow diagram begins at processing block, 502 where input data is provided and initialization is performed. One set of inputs are the estimated individual SINR for each subcarrier for the most recently received valid downlink signals. Another set of inputs are the table of $\beta$, $\alpha$, and $SINR_{AWGN}$ values for each of the CQIs which may be computed during offline simulations. The variable CQI_idx is used to index the table of values during the optimum CQI selection process. The CQI_idx is initialized to the lowest CQI value of zero. Similarly, the variable Selected_CQI is used to keep track of the best CQI during the course of the selection process and it is initialized to zero.

Figure 5:
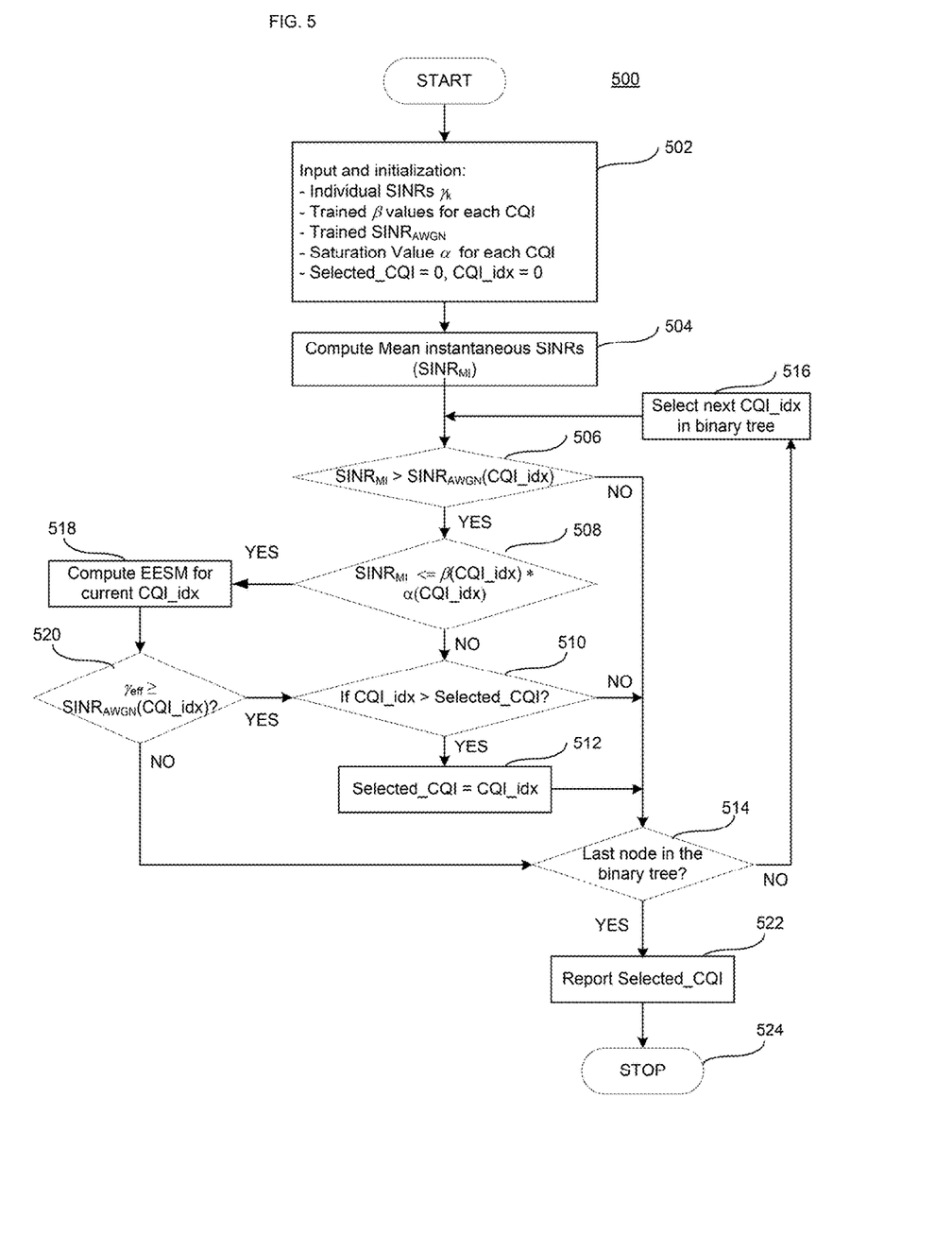
FIG. 5 illustrates an example flow diagram according to aspects of the present invention.

At processing stage 504, the mean instantaneous SINR ($SINR_{MI}$) is computed according to EQ. (2) using the input instantaneous SINR values $\gamma_k$. At processing stage 506, the $SINR_{MI}$ is compared against the $SINR_{AWGN}$ for the current CQI_idx being considered. The $SINR_{AWGN}$(CQI_idx) is obtained by indexing the $SINR_{AWGN}$ table using the CQI_idx. If the $SINR_{MI}$ is less than or equal to the $SINR_{AWGN}$(CQI_idx), the processing moves to the processing block 514. In the processing block 514, a check is performed whether the last node in the binary search tree as shown in FIG. 4 is reached or not. If the last node in the binary tree is not reached, then the processing moves to block 516 where the next CQI_idx is selected for evaluation based on the binary tree search. The processing then returns to the processing block 506.

At processing stage 506 if the $SINR_{MI}$ is greater than the $SINR_{AWGN}$(CQI_idx), the processing moves to block 508. In processing block 508, the $\beta$ value for the currently considered CQI is obtained by indexing the $\beta$ table using the CQI_idx. Similarly, the $\alpha$ value for the currently considered CQI is obtained by indexing the $\alpha$ table using the CQI_idx. Next, the product $\beta$(CQI_idx)*$\alpha$(CQI_idx) is compared against the $SINR_{MI}$. If the $SINR_{MI}$ is higher than the product, the processing moves to the block 510. Alternatively, the order of processing in blocks 506 and 508 can be reversed, or such processing may be performed in parallel.

At processing stage 510, the CQI_idx is compared against the current value of the Selected_CQI. If the CQI_idx is less than or equal to the Selected_CQI, the processing moves to the processing block 514. If the CQI_idx is greater than the Selected_CQI, the processing moves to the processing block 512. At processing stage 512 the Selected_CQI is updated to be equal to the CQI_idx and the processing then moves to the block 514.

Returning to processing block 508, if the $SINR_{MI}$ is less than or equal to the product $\beta$(CQI_idx)*$\alpha$(CQI_idx), the processing moves to the block 518. At processing block 518 the EESM computation is performed as specified in EQ. (1) to obtain $\gamma_{eff}$. Next at processing stage 520, first the $SINR_{AWGN}$ for the currently considered CQI is obtained by looking up the $SINR_{AWGN}$ using the CQI_idx. Next, if the $\gamma_{eff}$ is greater than or equal to the $SINR_{AWGN}$, the processing moves to block 510. If the $\gamma_{eff}$ is less than the $SINR_{AWGN}$, then the processing moves to block 514.

As described above, in the processing block 514, a check is performed whether the last node in the binary search tree is reached or not. If it is not the last node, the processing returns to block 516. If the last node in the binary tree is reached, the processing moves to the block 522. At processing block 522, the current value of Selected_CQI is used for reporting the CQI feedback to the base station. The processing for the optimum CQI selection terminates at processing block 524.

By way of example only, the above-described method may be implemented in a receiver, e.g., a user device such as a wireless mobile station (MS) 12 as shown in FIG. 1.

Figure 6:
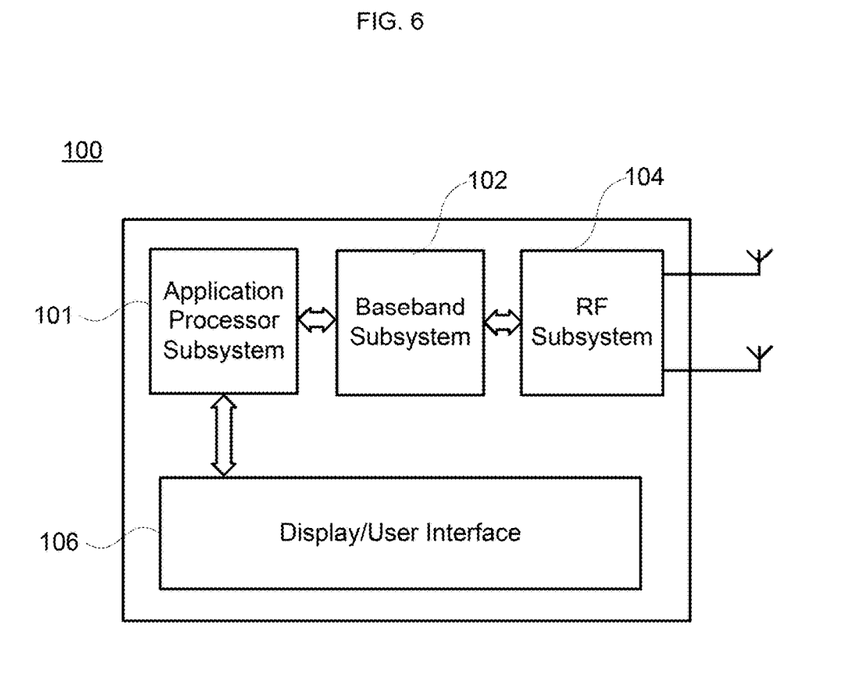
FIG. 6 illustrates an example system diagram of a wireless mobile station, which may be employed with aspects of the invention described herein.

As shown in FIG. 6, an example MS such as MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 7:
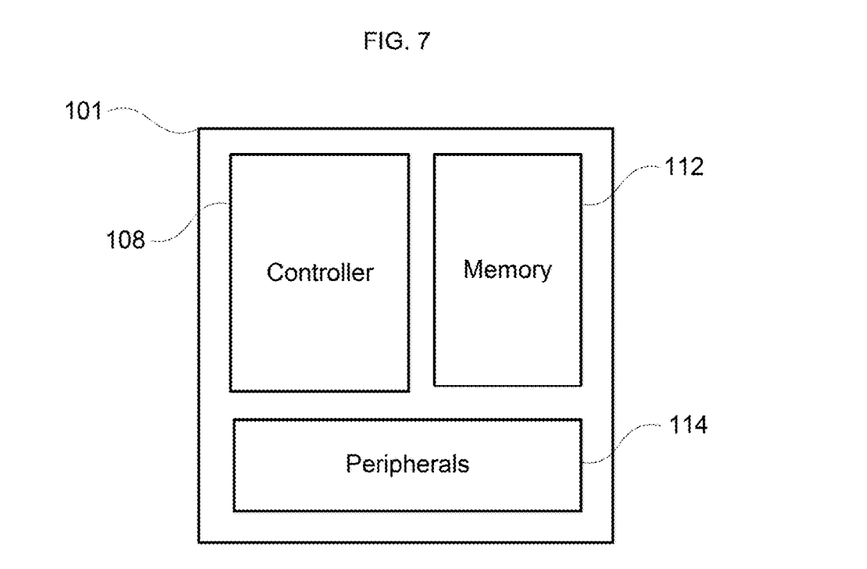
FIG. 7 illustrates an example application processor subsystem for a wireless mobile station, which may be employed with aspects of the invention described herein.
Figure 8:
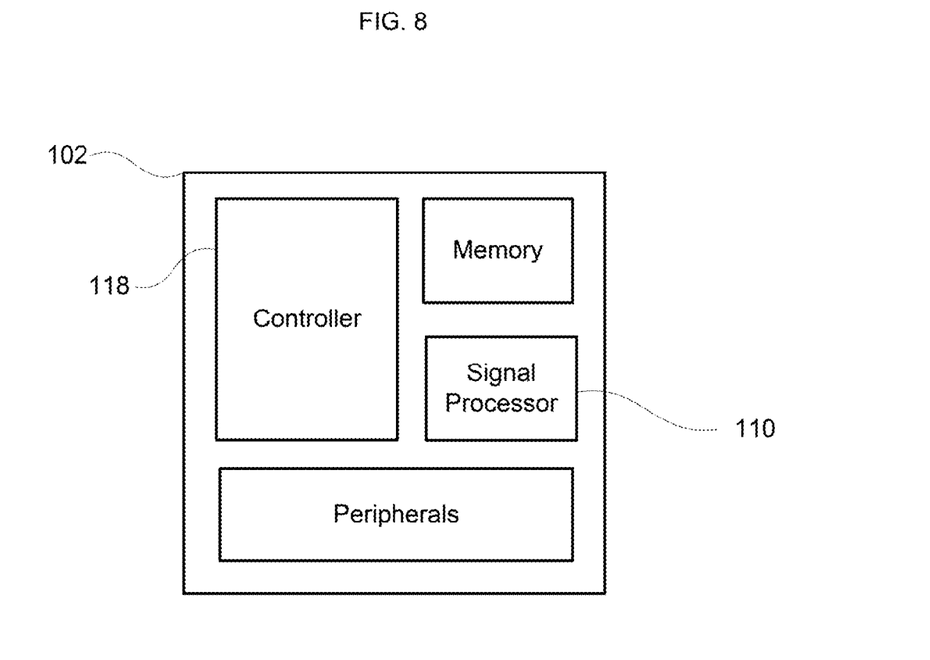
FIG. 8 illustrates an example baseband subsystem for a wireless mobile station, which may be employed with aspects of the invention described herein.
Figure 9:
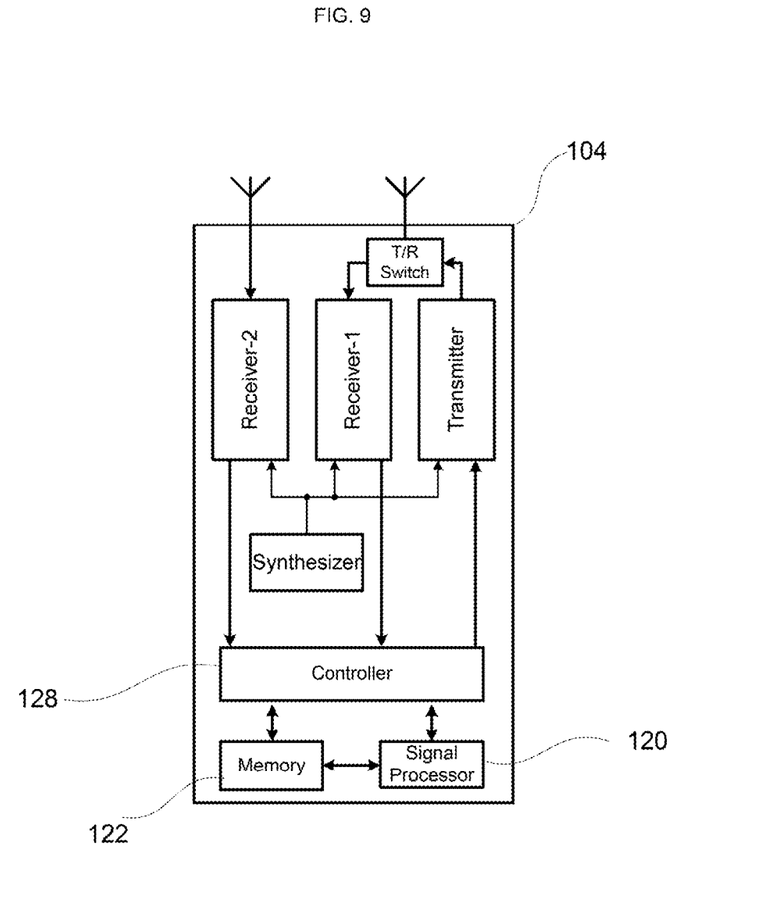
FIG. 9 illustrates an example RF subsystem for a wireless mobile station, which may be employed with aspects of the invention described herein.

The application processor subsystem 101 as shown in FIG. 7 may include a controller 108 such as a microcontroller or other processor, as well as memory 112 and one or more peripherals 114. The baseband subsystem 102 as shown in FIG. 8 may include a controller 118 such as a microcontroller or other processor. The RF subsystem 104 as shown in FIG. 9 may include a controller 128 such as a microcontroller or other processor. The controller 108 desirably handles overall operation of the MS 100. This may be done by software or firmware running on the controller 108. Such software/firmware may embody any methods in accordance with aspects of the present invention.

In FIG. 8 the peripherals such as a full or partial keyboard, video or still image display, audio interface, etc. may be employed and managed through the controller 108.

Aspects of the present invention may be implemented in firmware of the controller 108 of the application processor and/or the controller 118 of the baseband subsystem as shown in FIG. 6. In another alternative, aspects of the present invention may also be implemented as a combination of firmware and hardware of the application processor subsystem 101 and/or the baseband subsystem 102. For instance, a signal processing entity of any or all of the FIG. 8 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external non-transitory memory and any data, including the table of β, a, and $SINR_{AWGN}$ values, may be stored in such memory. The hardware may be an application specific integrated circuit ("ASIC"), field programmable gate array ("FPGA"), discrete logic components or any combination of such devices. The terms controller and processor are used interchangeably herein.

The consumer electronics devices that may use this invention may include smartphones, tablets, laptops, gaming consoles, cameras, video camcorders, TV, car entertainment systems, etc.

The various aspects of the invention described herein provide a new and more efficient method of processing. And this leads to improved performance of portable communication devices in the broadband wireless communication system.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

The invention claimed is:

1. A method comprising:
   obtaining, by a processor, one or more inputs including a set of instantaneous Signal-to-Interference-plus-Noise Ratio (SINR) values $\gamma_k$;
   determining, by the processor, a mean instantaneous SINR ($SINR_{MI}$) according to the instantaneous SINR values $\gamma_k$, the $SINR_{MI}$ being a linear average of the instantaneous SINR values $\gamma_k$;
   determining, by the processor, a first adaptive selection criterion that identifies an upper limit on a supportable Channel Quality Indicator (CQI) for prevailing signal conditions in relation to the $SINR_{MI}$;
   determining, by the processor, a second adaptive selection criterion that identifies a lower limit on the supportable CQI for the prevailing signal conditions in relation to the $SINR_{MI}$;
   deriving, by the processor from the supportable CQI between the identified upper and lower limits of the first and second selection criteria, a selected CQI parameter; and
   using the selected CQI parameter to implement a modulation and coding scheme for communication between the client device and a base station in the wireless communication system;
   wherein determining the second adaptive selection criterion includes comparing the $SINR_{MI}$ against a metric derived from parameters associated with the currently considered CQI; and
   wherein determining the second adaptive selection criterion is done according to the following comparison:

$$SINR_{MI} \leq \beta(CQI_{CURRENT}) * \alpha(CQI_{CURRENT}),$$

wherein the metric includes parameters β and α, where β is a value specific to the currently considered CQI and α is a saturation value.

2. The method of claim 1, wherein determining the first adaptive selection criterion includes comparing the $SINR_{MI}$ against an Additive White Gaussian Noise SINR ($SINR_{AWGN}$) for a currently considered CQI.

3. The method of claim 1, wherein when the $SINR_{MI}$ is greater than $\beta(CQI_{CURRENT})*\alpha(CQI_{CURRENT})$, the method further comprises setting the selected CQI to be equal to the currently considered CQI.

4. The method of claim 1, wherein α is a number that is a function of a bit width of a specific implementation used by the client device.

5. The method of claim 1, further comprising:
   estimating, by the processor, an effective SINR; and
   comparing the effective SINR against the $SINR_{AWGN}$ for a currently considered CQI.

6. The method of claim 5, wherein estimating the effective SINR includes calculating an Effective Exponential SINR Mapping (EESM).

7. The method of claim 6, wherein the EESM is calculated for a particular CQI only when the $SINR_{MI}$ is greater than the $SINR_{AWGN}$ of the particular CQI.

8. The method of claim 6, wherein the EESM is calculated for a particular CQI only when the $SINR_{MI}$ is greater than $\beta(CQI_{CURRENT})*\alpha(CQI_{CURRENT})$.

9. The method of claim 1, wherein determining the first and second adaptive selection criteria are repeated until a condition where $SINR_{MI} > \beta(CQI_{CURRENT})*\alpha(CQI_{CURRENT})$ is met, where β is a value specific to a currently considered CQI and α is a saturation value.

10. The method of claim 9, wherein α is determined by an offline simulation.

11. The method of claim 1, wherein determining the first and second adaptive selection criteria are performed without calculating an Effective Exponential SINR Mapping (EESM).

12. The method of claim 1, wherein the set of input instantaneous SINR values $\gamma_k$ are for each subcarrier from a set of most recently received valid downlink signals.

13. The method of claim 1, wherein the one or more inputs further include one or more of a set of β values, a set of a values, and a set of $SINR_{AWGN}$ values for each CQI.

14. A receiver device for a wireless communication apparatus, the receiver device comprising:
   means for receiving signals from one or more base stations in a wireless communication system; and
   one or more processing devices operatively coupled to the receiving means, the one or more processing devices being configured to:
      obtain one or more inputs including a set of instantaneous Signal-to-Interference-plus-Noise Ratio (SINR) values $\gamma_k$;
      determine a mean instantaneous SINR ($SINR_{MI}$) according to the instantaneous SINR values $\gamma_k$, the $SINR_{MI}$ being a linear average of the instantaneous SINR values $\gamma_k$;
      determine a first adaptive selection criterion that identifies an upper limit on a supportable Channel Quality Indicator (CQI) for prevailing signal conditions in relation to the $SINR_{MI}$;

determine a second adaptive selection criterion that identifies a lower limit on the supportable CQI for the prevailing signal conditions in relation to the $SINR_{MI}$;

derive, from the supportable CQI between the identified upper and lower limits of the first and second selection criteria, a selected CQI parameter; and use the selected CQI parameter to implement a modulation and coding scheme for communication between the wireless communication apparatus and the one or more base stations in the wireless communication system;

wherein to determine the second adaptive selection criterion includes comparing the $SINR_{MI}$ against a metric derived from parameters associated with the currently considered CQI; and wherein to determine the second adaptive selection criterion is done according to the following comparison:

$SINR_{MI} \leq \beta(CQI_{CURRENT}) * \alpha(CQI_{CURRENT})$, wherein the metric includes parameters $\beta$ and $\alpha$, where $\beta$ is a value specific to the currently considered CQI and $\alpha$ is a saturation value.

15. The receiver device of claim 14, wherein the first adaptive selection criterion is determined by comparing the $SINR_{MI}$ against an Additive White Gaussian Noise SINR ($SINR_{AWGN}$) for a currently considered CQI.

16. A non-transitory recording medium storing instructions thereon, the instructions, when executed by one or more processors, causing the one or more processors to execute a method comprising:

obtaining one or more inputs including a set of instantaneous Signal-to-Interference-plus-Noise Ratio (SINR) values $\gamma_k$;

determining a mean instantaneous SINR ($SINR_{MI}$) according to the instantaneous SINR values $\gamma_k$, the $SINR_{MI}$ being a linear average of the instantaneous SINR values $\gamma_k$;

determining a first adaptive selection criterion that identifies an upper limit on a supportable Channel Quality Indicator (CQI) for prevailing signal conditions in relation to the $SINR_{MI}$;

determining a second adaptive selection criterion that identifies a lower limit on the supportable CQI for the prevailing signal conditions in relation to the $SINR_{MI}$;

deriving, from the supportable CQI between the identified upper and lower limits of the first and second selection criteria, a selected CQI parameter; and using the selected CQI parameter to implement a modulation and coding scheme for communication between the client device and a base station in the wireless communication system;

wherein determining the second adaptive selection criterion includes comparing the $SINR_{MI}$ against a metric derived from parameters associated with the currently considered CQI; and wherein determining the second adaptive selection criterion is done according to the following comparison:

$SINR_{MI} \leq \beta(CQI_{CURRENT}) * \alpha(CQI_{CURRENT})$, wherein the metric includes parameters $\beta$ and $\alpha$, where $\beta$ is a value specific to the currently considered CQI and $\alpha$ is a saturation value.

17. The recording medium of claim 16, wherein:

determining the first adaptive selection criterion includes comparing the $SINR_{MI}$ against an Additive White Gaussian Noise SINR ($SINR_{AWGN}$) for a currently considered CQI.

* * * * *